United States Patent [19]

Makino

[11] Patent Number: 4,592,311
[45] Date of Patent: Jun. 3, 1986

[54] INTAKE SYSTEM FOR TWO-CYCLE MULTI-CYLINDER ENGINES

[75] Inventor: Sakae Makino, Hamakita, Japan

[73] Assignee: Yamaha Hatsudoki Kabushiki Kaisha, Japan

[21] Appl. No.: 654,650

[22] Filed: Sep. 25, 1984

[30] Foreign Application Priority Data

Sep. 26, 1983 [JP] Japan ................. 58-177571

[51] Int. Cl.⁴ .............................................. F02B 33/04
[52] U.S. Cl. ................. 123/73 A; 123/52 A; 123/52 MV
[58] Field of Search .............. 123/73 A, 73 PP, 73 R, 123/52 M, 52 A, 52 MC, 52 MV; 180/225, 219

[56] References Cited

U.S. PATENT DOCUMENTS

| | | | |
|---|---|---|---|
| Re. 31,724 | 11/1984 | Isaka | 123/55 VF |
| 1,607,431 | 11/1926 | Brice | 123/73 A |
| 3,530,841 | 9/1970 | Haft et al. | 123/73 R |
| 3,687,118 | 8/1972 | Nomura | 123/73 A |
| 4,261,305 | 4/1981 | Ikoma | 123/73 A |
| 4,321,978 | 3/1982 | Tominaga et al. | 123/73 A |
| 4,470,379 | 9/1984 | Miyakoshi et al. | 123/52 A |
| 4,474,144 | 10/1984 | Tanaka et al. | 123/52 MV |

FOREIGN PATENT DOCUMENTS

| | | | |
|---|---|---|---|
| 57-186640 | 11/1982 | Japan . | |
| 167871 | 10/1983 | Japan | 123/55 VF |
| 15647 | 1/1984 | Japan | 123/52 M |

*Primary Examiner*—Magdalen Y. C. Greenlief
*Attorney, Agent, or Firm*—Ernest A. Beutler

[57] ABSTRACT

A motorcycle having a V4 crankcase compression, two-cycle internal combustion engine having an improved, compact induction system. The induction system for the cylinders of one bank discharges directly into the crankcases of those cylinders and is fed with a pair of carburetors through an induction system which induction system is positioned at least in part in the area between the banks of cylinders. The carburetors are disposed at least in part at the sides of the engine. The cylinders of the other bank are supplied with a charge indirectly to their crankcases through a similarly configured induction system. The induction system of one bank has its charge forming devices positioned above the charge forming devices of the other bank.

36 Claims, 3 Drawing Figures

INTAKE SYSTEM FOR TWO-CYCLE MULTI-CYLINDER ENGINES

BACKGROUND OF THE INVENTION

This invention relates to an intake system for a two-cycle multi-cylinder engine and more particularly to a compact engine and induction system for a multiple cylinder engine.

In most applications, it is desirable to provide an engine that has a relatively compact construction. The compactness should not, however, interfere with the operation of the engine nor should it render it difficult to service the engine. The desire for compact serviceable internal combustion engines is particularly important in connection with motorcycles wherein the entire vehicle must be compact.

One engine arrangement, wherein multiple cylinders are employed, that is particularly advantageous from a compactness standpoint, is the use of a V type engine. However, when a V type engine is employed and it is operated on the two-cycle, crankcase compression principle, it is difficult to place the induction system and charge forming devices in the valley of the V without substantially increasing the V angle and hence the overall size of the engine.

It is, therefore, a principal object of this invention to provide an improved compact V type of engine.

It is a further object of this invention to provide an improved induction system for a multiple cylinder V type engine that affords a compact construction.

SUMMARY OF THE INVENTION

This invention is adapted to be embodied in a two-cycle, crankcase compression engine having a first cylinder reciprocally supporting a first piston, a second cylinder that is offset from the first cylinder and which reciprocally supports a second piston. A first crankcase is associated with the first cylinder and first transfer passage means transfer a compressed charge from the first crankcase to the area in the first cylinder above the first piston during at least a portion of the stroke of the first piston. A second crankcase is associated with the second cylinder and second transfer passage means are provided for transferring a compressed charge from the second crankcase to the area in the second cylinder above the second piston during at least a portion of the stroke of the second piston. The first and second cylinders have facing sides that are spaced from each other and an induction system for the crankcases is disposed at least in part between the facing sides.

DETAILED DESCRIPTION OF THE PREFERRED EMBODIMENT

Figure 1:
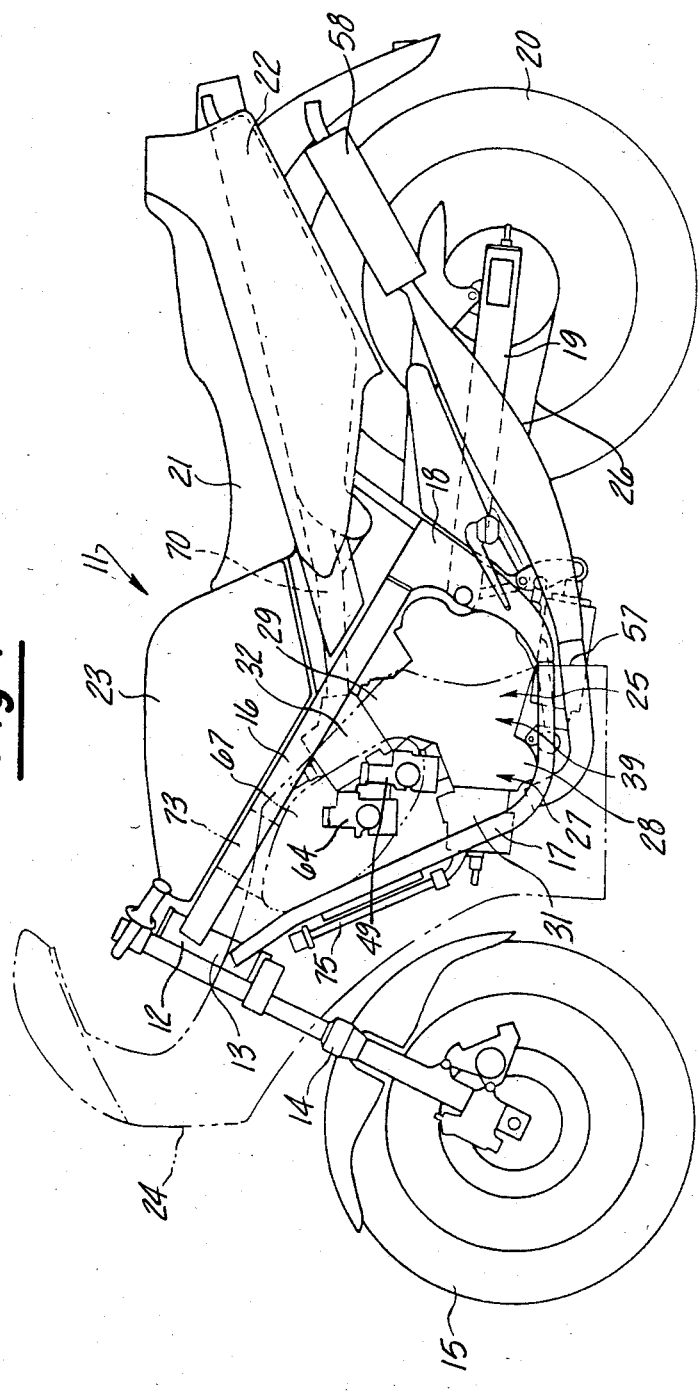
FIG. 1 is a side elevational view of a motorcycle embodying an engine and induction system constructed in accordance with the invention.
Figure 2:
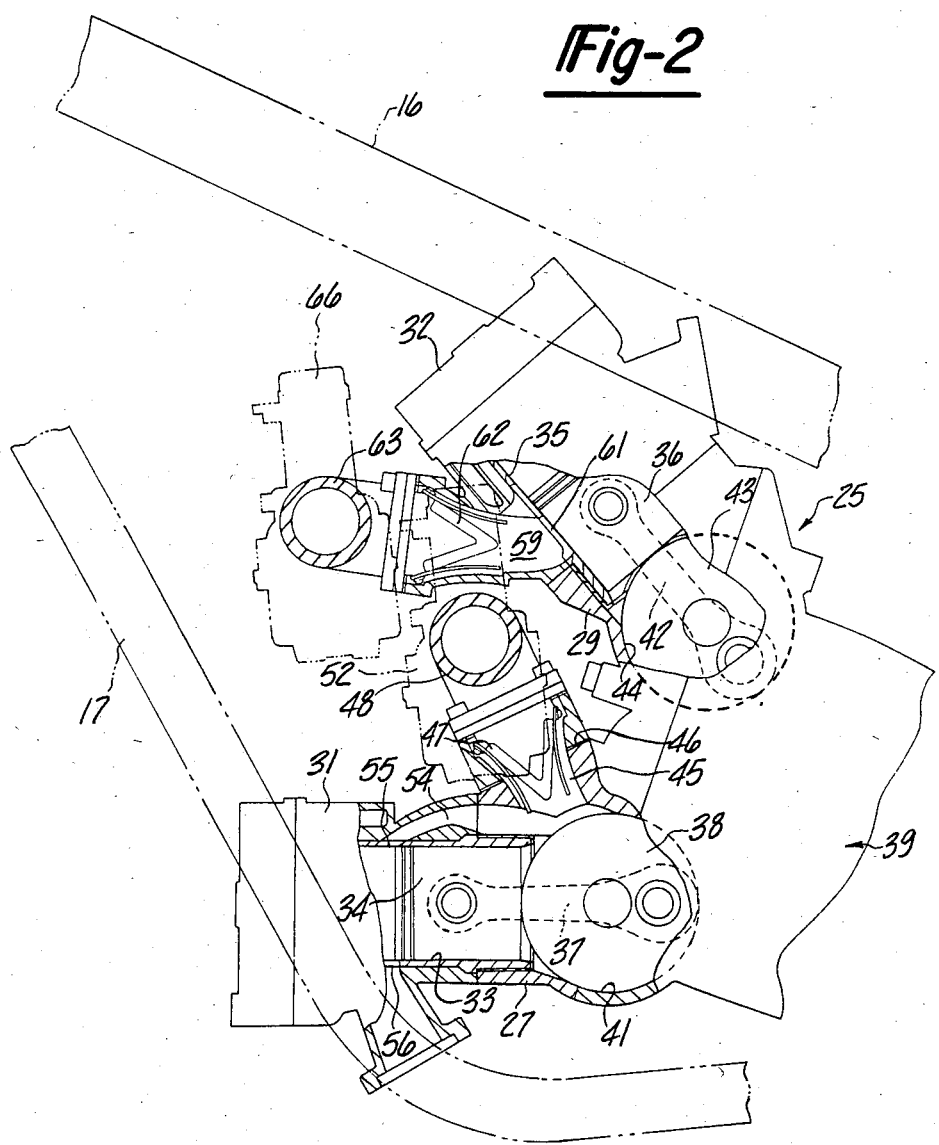
FIG. 2 is an enlarged side elevational view of the portion of the motorcycle accommodating the engine and its induction system, with portions shown in section and other portions shown in phantom.
Figure 3:
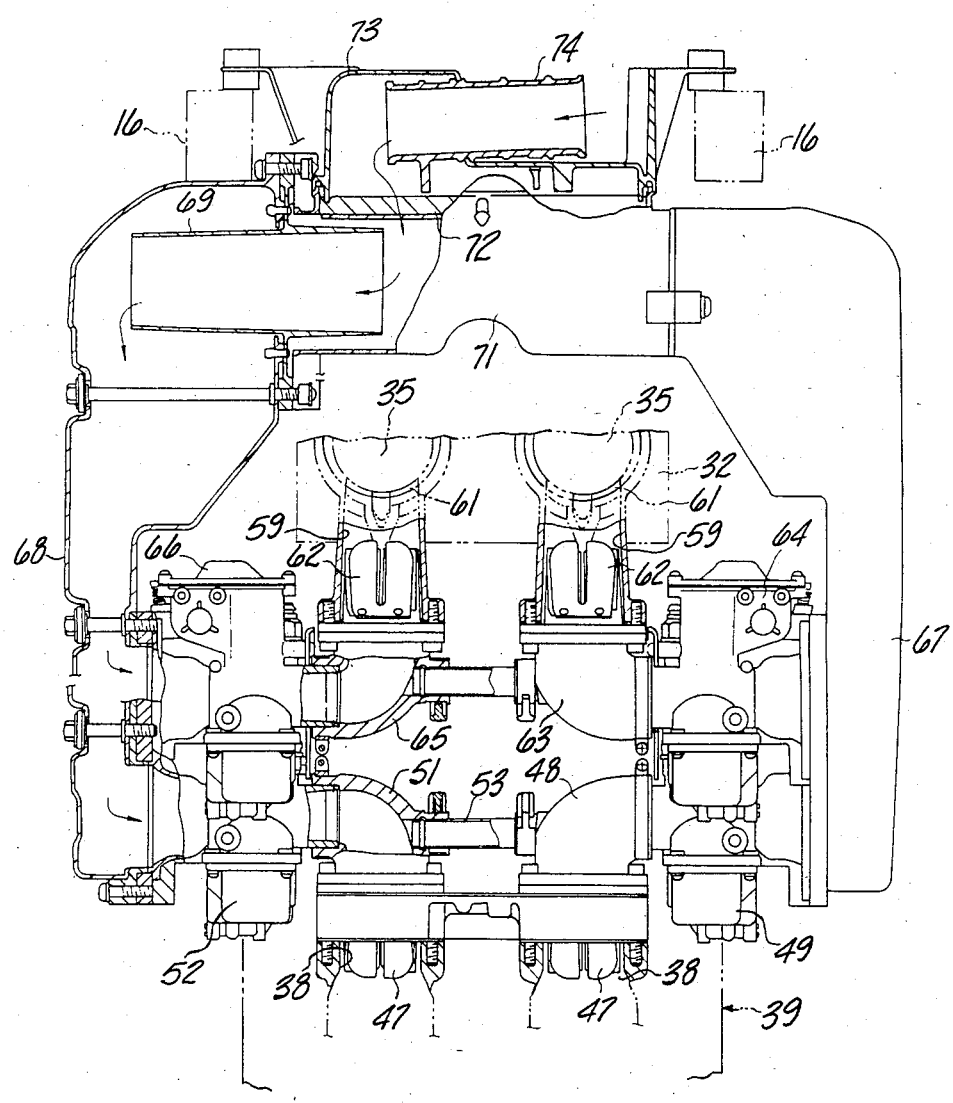
FIG. 3 is a top plan view, with portions broken away, showing the induction system of the engine with other components being illustrated in phantom.

Referring first primarily to FIG. 1, a motorcycle constructed in accordance with an embodiment of the invention is identified generally by the reference numeral 11. The motorcycle 11 is comprised of a frame assembly, indicated generally by the reference numeral 12 and which is of the welded up type. The frame assembly 12 is, in the illustrated embodiment, made up of aluminum tubing and includes a head tube 13 that supports a front fork assembly 14 for steering movement in a known manner. The front fork assembly 14, in turn, journals a front wheel 15.

A pair of tank tubes 16 extend from the head tube 12 rearwardly and downwardly. In a similar manner, a pair of down tubes 17 extend from the lower end of the head tube 13 downwardly and rearwardly and are joined to the tank tubes 16 at each side of the motorcycle 11 by means of brackets 18.

A rear wheel 20 is supported on the frame assembly 12 by means of a trailing arm mechanism 19 and suitable suspension element (not shown). A seat 21 is supported on the frame 12 above the rear wheel 20 and a side cover 22 depends from the seat 21 and overlies the upper sides of the rear wheel 20. A fuel tank 23 is carried by the frame 12 forwardly of the seat 21.

The motorcycle 11 may also include a protective cowling of any type which is shown in phantom in FIG. 1 and identified by the reference numeral 24.

The construction of the motorcycle 11 thus far described may be considered to be conventional. In accordance with the invention, a combined engine and transmission assembly, indicated generally by the reference numeral 25 and incorporating an induction system in accordance with the invention is mounted by the frame assembly 12 and drives the rear wheel 20 through its integral change speed transmission and a chain 26.

Referring now additionally to the remaining figures, the engine transmission assembly 25 is comprised of a cylinder block casing 27 having a first generally horizontally extending bank 28 and a second generally vertically extending bank 29. The banks 28 and 29 are disposed at a V angle inasmuch as the engine portion of the engine transmission assembly 25 is of the V type, as will be described. A first cylinder head, block assembly 31 is affixed to the bank 28 and a second cylinder head, block assembly 32 is affixed to the bank 29. The engine is of the four-cylinder type and, to this end, the block 31 is formed with a pair of transversely spaced apart cylinder liners 33 in which pistons 34 are supported for reciprocation. In a similar manner, the head, block 32 is formed with a pair of transversely spaced cylinder liners 35 in which pistons 36 are supported for reciprocation.

The pistons 34 associated with the cylinder block 31 and cylinder bank 28 are connected by means of connecting rods 37 to a crankshaft 38 that is rotatably journaled between the cylinder block 27 and a combined transmission and crankcase casing, indicated generally by the reference numeral 39. The casing 39 defines with the cylinder blocks 27 a plurality of first crankcase chambers 41, one for each cylinder 33. Since the engine operates on the two-stroke, crankcase compression principle, the crankcase chambers 41 are sealed each from the other.

In a similar manner, the pistons 36 associated with the cylinder bores 35 of the head and block assembly 32 are connected by means of connecting rods 42 to a crankshaft 43 which is journaled between the cylinder block 27 and the crankcase casing 39. Again, the cylinder block 27 and crankcase casing 39 form a plurality of crankcase chambers 44, one for each cylinder 35, which are sealed from each other.

A change speed transmission (not shown) of any type is contained within the transmission portion of the crankcase transmission case 39 and, as has been noted, drives the rear wheel 20 through the chain 26 in a known manner.

In accordance with the invention, the engine is provided with an induction system for delivering a fuel/air charge to the crankcase chambers 41 and 44 which is disposed, at least in part, in the area between the facing sides of the cylinder blocks 31 and 32 and which is compact in nature. To this end, the lowermost cylinder bank 28 and block 31 is formed with intake passages 45 that extend from the respective crankcase chambers 41 in a generally vertically upwardly extending direction through the cylinder block bank 28 and which terminate in generally horizontally extending surfaces 46. A reed valve assembly 47 affixed to each of the surfaces 46 for providing a one-way flow control through the passages 45 into the crankcase chambers 41. A short right angled intake manifold is provided for each intake passage 45. One of these manifolds 48 extends out one side of the V wherein it mounts a lower carburetor 49 that provides a fuel/air charge for delivery to the adjacent crankcase chamber 41. A similarly, but oppositely disposed, curved manifold 51 associates with the other cylinder bore 33 and extends out the other side of the V wherein it mounts a carburetor 52 that provides a fuel/air charge for this crankcase chamber 41. If desired, the manifolds 48 and 51 may be provided with an interconnecting balance passageway 53.

The charge which has been admitted from the respective carburetors 49 or 52 to the crankcase chambers 41 through the induction manifolds 48, 51, is compressed upon reciprocation of the pistons 34 and is transferred to the area above the pistons 34 through one or more transfer or scavenge passages 54 that extend through the cylinder blocks 31 and terminate in scavenge or intake ports 55. This charge is then fired by means of a spark plug in a known manner and the burnt charge is discharged through an exhaust port 56 to a first exhaust system 57 that includes a muffler 58.

The induction system for the cylinders of the bank 29 and the head and block assembly 32 differs from those associated with the bank 28 and head, block assembly 31. These cylinders 35 are provided with intake passages 59 that extend through the cylinder head, block assembly 32 and terminate at intake ports 61 that extend through the wall of the cylinder liners 35. When the pistons 36 are at the upper portion of their stroke, the ports 61 will be uncovered and the passages 59 may communicate with the crankcase chambers 44.

If desired, reed type intake valves 62 may also be provided in each of the intake passages 59 for preventing reverse flow. Each passage 59 is provided with a respective intake manifold, which like the manifolds 48 and 51 are provided with right angle curves. The one intake passage 59 is provided with an intake manifold 63 that curves outwardly toward the same side of the engine as the manifold 48. The manifold 63 is fed from a carburetor 64 that is supported vertically above the carburetor 49 of the lower bank. In a similar manner, a curved manifold 65 extends from the other bank of this cylinder outwardly to the same side of the engine as the manifold 51 and communicates with a carburetor 66 that is supported above the carburetor 52 of the lower bank. It should be readily apparent that this placing of the carburetors 49, 52, 64 and 66, two at each end of the engine and one above the other, provides an extremely compact relationship while at the same time affording free access to the carburetors for servicing.

The cylinders of the bank 32 are also provided with exhaust ports that discharge to the atmosphere through an exhaust system including a muffler, indicated generally by the reference numeral 70.

The carburetors 49 and 64 are provided with an air box 67 that supplies filtered and silenced air, in a manner to be described, to their respective air horns. The air box 67 is positioned on the same side of the motorcycle 11 as the carburetors 49 and 64. Since the carburetors 49 and 64 are positioned, at least in part, outside of the V angle of the engine, the air box 67 can be of sufficient volume so as to provide the requisite degree of silencing. In a similar manner, an air box 68 is positioned on the opposite side of the motorcycle 11 and supplies silenced and filtered air to the carburetors 52 and 66. Like the air box 67, the air box 68 has sufficient volume so as to provide the requisite degree of silencing.

Each of the air boxes 67 and 68 provided with a tuning pipe air inlet 69 that has a length and diameter and relationship to the internal volume of the air boxes 67 and 68 so as to function as a Helmholtz resonator and provide a silencing effect for the induction air. The inlet tuning pipes 69 each extend into a common inlet chamber 71 that is positioned above the engine transmission assembly 25 and forwardly of it. An air filter element 72 is positioned across an inlet opening of the chamber 71 and receives air from an inlet chamber 73 which, in turn, receives outside air from a further tuned inlet pipe 74. The inlet pipe 74 and the internal volume of the chamber 73 is chosen so as to provide further silencing to the induction system intake air.

The engine portion of the engine transmission assembly 25 may, in accordance with the illustrated embodiment, be of the water cooled type. To this end, the cylinder head, block assemblies 31 and 32 are each provided with cooling jackets that receive water from a forward mounted coolant radiator 75. The coolant is circulated by means of an engine driven coolant pump (not shown) in a known manner. Since the cooling system forms no part of the invention, it has not been illustrated nor will it be described further.

It should be readily apparent that the described induction system and engine configuration provides an extremely compact V type of engine which has an efficient and effective induction system and wherein the induction system components and particularly the carburetors are positioned so that they may be conveniently serviced. Although an embodiment of the invention has been illustrated and described, various changes and modifications may be made without departing from the spirit and scope of the invention, as defined by the appended claims. For example, although the cylinders of the forward lowermost cylinder bank 31, 28, have their induction system discharging directly into the crankcase chambers 41 while the rearward or uppermost bank 32, 29 has its induction system discharging into the crankcase chambers 44 through the cylinder liners, the situation could be reversed. That is, the induction system of the type employed for the cylinder bank 29, 32 could be reversed with that of the type used for the cylinder bank 28, 31. Also, although the invention has been described in conjuction with A V4 type of engine, it could be utilized with a V engine having two cylinders or with engines having more than two cylinders. Furthermore, certain facets of the invention may be used with engines havine cylinder banks that are not disposed in a V arrangement but which are positioned in parallel relationship to each other.

I claim:

1. In a two-cycle, crankcase compression engine having a first cylinder reciprocally supporting a first piston, a second cylinder offset from said first cylinder and reciprocally supporting a second piston, a first crankcase associated with said first cylinder, first transfer passage means for transferring a compressed charge from said first crankcase to the area in said first cylinder above said first piston during at least a portion of the stroke of said first piston, a second crankcase associated with said second cylinder and sealed from said first crankcase, second transfer passage means for transferring a compressed charge from said second crankcase to the area in said second cylinder above said second piston during at least a portion of the stroke of said second piston, said first and said second cylinders having facing sides spaced from each other, and an induction system for said crankcases disposed at least in part between said facing sides.

2. In a two-cycle, crankcase compression engine as set forth in claim 1 wherein the induction system for one of the crankcases discharges directly into the crankcase and the induction system for the other of the crankcases discharges into the crankcase indirectly.

3. In a two-cycle, crankcase compression engine as set forth in claim 2 wherein the induction system that discharges directly into the crankcase is provided with reed valve means and the other induction system cooperates with the piston of the associated cylinder whereby the piston functions as an inlet valve.

4. In a two-cycle, crankcase compression engine as set forth in claim 1 wherein the induction system includes a pair of charge forming devices, one for each cylinder bank and one positioned above the other.

5. In a two-cycle, crankcase compression engine as set forth in claim 4 wherein the charge forming devices are positioned at one side of the engine and at least in part spaced from the area between the facing sides of the cylinders.

6. In a two-cycle, crankcase compression engine as set forth in claim 5 wherein the induction system for one of the crankcases discharges directly into the crankcase and the induction system for the other of the crankcases discharges into the crankcase indirectly.

7. In a two-cycle, crankcase compression engine as set forth in claim 5 wherein the charge forming devices are provided with a common air filter and air silencer.

8. In a two-cycle, crankcase compression engine as set forth in claim 7 wherein the induction system for one of the crankcases discharges directly into the crankcase and the induction system for the other of the crankcases discharges into the crankcase indirectly.

9. In a two-cycle, crankcase compression engine as set forth in claim 8 wherein the induction system that discharges directly into the crankcase is provided with reed valve means and the other induction system cooperates with the piston of the associated cylinder whereby the piston functions as an inlet valve.

10. In a two-cycle, crankcase compression engine as set forth in claim 1 wherein the engine has four cylinders, comprising, in addition to the first and second cylinders, a third cylinder formed in the same block as the first cylinder and a fourth cylinder formed in the same block as the second cylinder, said third and fourth cylinders each reciprocatively supporting respective third and fourth pistons and having associated third and fourth crankcases and third and fourth transfer passage means for transferring a charge from their respective crankcases to the area above their respective pistons during at least a portion of the stroke of the respective pistons, the crankcases being each sealed from the others, the engine further including an induction system for the third and fourth cylinders disposed at least in part between the facing sides of the respective cylinder blocks.

11. In a two-cycle, crankcase compression engine as set forth in claim 10 wherein the induction system for the crankcases of one of the blocks discharges directly into the crankcases and the induction system for the crankcases of the other block discharges indirectly into the crankcases.

12. In a two-cycle, crankcase compression engine as set forth in claim 11 wherein the induction system that discharges directly into the crankcases are provided with reed valve means and the other induction system cooperates with the pistons of the associated cylinders whereby the pistons function as inlet valves.

13. In a two-cycle, crankcase compression engine as set forth in claim 10 wherein the induction system includes two pairs of charge forming devices.

14. In a two-cycle, crankcase compression engine as set forth in claim 13 wherein said pair of charge forming devices is positioned at one side of the engine and at least in part spaced from the area between the facing sides of the cylinders.

15. In a two-cycle, crankcase compression engine as set forth in claim 14 wherein the induction system for the cylinders of one cylinder bank discharges directly into the crankcase and the induction system for the other of the cylinder banks discharges into the crankcase indirectly.

16. In a two-cycle, crankcase compression engine as set forth in claim 14 wherein the charge forming devices are provided with a common air filter and air silencer.

17. In a two-cycle, crankcase compression engine as set forth in claim 16 wherein the induction system for one of the cylinder banks discharges directly into the crankcases of that bank and the induction system for the other of the banks discharges into the crankcases of that bank indirectly.

18. In a two-cycle, crankcase compression engine as set forth in claim 17 wherein the induction system that discharges directly into the crankcases is provided with reed valve means and the other induction system cooperates with the pistons of the associated cylinders whereby the pistons function as inlet valves.

19. In a two-cycle, crankcase compression engine as set forth in claim 1 wherein the cylinders are disposed at a V angle relative to each other.

20. In a two-cycle, crankcase compression engine as set forth in claim 19 wherein the induction system for one of the crankcases discharges directly into the crankcase and the induction system for the other of the crankcases discharges into the crankcase indirectly.

21. In a two-cycle, crankcase compression engine as set forth in claim 20 wherein the induction system that discharges directly into the crankcase is provided with reed valve means and the other induction system cooperates with the piston of the associated cylinder whereby the piston functions as an inlet valve.

22. In a two-cycle, crankcase compression engine as set forth in claim 19 wherein the induction system includes a pair of charge forming devices, one for each cylinder bank and one positioned above the other.

23. In a two-cycle, crankcase compression engine as set forth in claim 22 wherein the charge forming devices are positioned at one side of the engine and at least in part spaced from the area between the facing sides of the cylinders.

24. In a two-cycle, crankcase compression engine as set forth in claim 23 wherein the induction system for one of the crankcases discharges directly into the crankcase and the induction system for the other of the crankcases discharges into the crankcase indirectly.

25. In a two-cycle, crankcase compression engine as set forth in claim 23 wherein the charge forming devices are provided with a common air filter and air silencer.

26. In a two-cycle, crankcase compression engine as set forth in claim 25 wherein the induction system for one of the crankcases discharges directly into the crankcase and the induction system for the other of the crankcases discharges into the crankcase indirectly.

27. In a two-cycle, crankcase compression engine as set forth in claim 26 wherein the induction system that discharges directly into the crankcase is provided with reed valve means and the other induction system cooperates with the piston of the associated cylinder whereby the piston functions as an inlet valve.

28. In a two-cycle, crankcase compression engine as set forth in claim 19 wherein the engine has four cylinders, comprising, in addition to the first and second cylinders, a third cylinder formed in the same bank as the first cylinder and a fourth cylinder formed in the same bank as the second cylinder, said third and fourth cylinders each reciprocatively supporting respective third and fourth pistons and having associated third and fourth crankcases and third and fourth transfer passage means for transferring a charge from their respective crankcases to the area above their respective pistons during at least a portion of the stroke of the respective pistons, the crankcases being each sealed from the others, the engine further including an induction system for the third and fourth cylinders disposed at least in part between the facing sides of the respective cylinder blocks.

29. In a two-cycle, crankcase compression engine as set forth in claim 28 wherein the induction system for the cylinders of one of the banks discharges directly into the crankcases of the cylinders of that bank and the induction system for the cylinders of the other bank discharges indirectly into the crankcases of the cylinders of that bank.

30. In a two-cycle, crankcase compression engine as set forth in claim 29 wherein the induction systems that discharge directly into the crankcases are provided with reed valve means and the other induction systems cooperate with the pistons of the associated cylinders whereby the pistons function as inlet valves.

31. In a two-cycle, crankcase compression engine as set forth in claim 28 wherein the induction system includes pairs of charge forming devices, one charge forming device of each pair serving a cylinder of each cylinder bank and one positioned above the other.

32. In a two-cycle, crankcase compression engine as set forth in claim 31 wherein the charge forming devices of each pair is positioned at a respective one side of the engine and at least in part spaced from the area between the facing sides of the cylinders.

33. In a two-cycle, crankcase compression engine as set forth in claim 32 wherein the induction system for one of the cylinder banks discharges directly into the crankcases and the induction system for the other of the cylinder banks discharges into the crankcases indirectly.

34. In a two-cycle, crankcase compression engine as set forth in claim 32 wherein the charge forming devices are provided with a common air filter and air silencer.

35. In a two-cycle, crankcase compression engine as set forth in claim 34 wherein the induction system for one of the cylinder banks discharges directly into the crankcases and the induction system for the other of the cylinder banks discharges into the crankcases indirectly.

36. In a two-cycle, crankcase compression engine as set forth in claim 35 wherein the induction system that discharges directly into the crankcases is provided with reed valve means and the other induction system cooperates with the pistons of the associated cylinders whereby the pistons functions as an inlet valves.

* * * * *